United States Patent [19]

Stansbury, Jr.

[11] Patent Number: 4,544,245
[45] Date of Patent: Oct. 1, 1985

[54] ADJUSTABLE SAFETY SPECTACLE

[75] Inventor: Benjamin H. Stansbury, Jr., Beverly Hills, Calif.

[73] Assignee: McKesson Corporation, San Francisco, Calif.

[21] Appl. No.: 58,020

[22] Filed: Jul. 16, 1979

[51] Int. Cl.⁴ .............................. G02C 5/20; G02C 5/14
[52] U.S. Cl. .................................... 351/120; 351/118; 351/86; 351/149
[58] Field of Search ................... 2/451, 449, 448, 450; 351/118, 106, 86, 57, 58, 118, 149, 115

[56] References Cited

U.S. PATENT DOCUMENTS

| 2,427,918 | 9/1947 | Malcom et al. | 2/441 |
| 2,715,224 | 8/1955 | Morrow | 2/451 |
| 2,797,617 | 7/1957 | Ring | 351/118 |
| 2,918,570 | 12/1959 | Deidring | 350/257 |
| 4,017,165 | 4/1977 | Davis | 351/120 |
| 4,196,982 | 4/1980 | Watkins | 351/86 |

FOREIGN PATENT DOCUMENTS

| 1545091 | 9/1968 | France | 351/118 |
| 303730 | 1/1929 | United Kingdom | 351/118 |

Primary Examiner—Rodney B. Bovernick
Attorney, Agent, or Firm—Charles H. Schwartz; Ellsworth R. Roston

[57] ABSTRACT

An adjustable safety spectacle including a frame member including a nose bridge and lens supporting sections extending from the nose bridge and with the lens supporting sections including outwardly extending arm portions, a pair of adjustable length temple members including telescoping side arms, individual means coupled to the outwardly extending arm portions of the frame member and the temple members for individually pivotably mounting the temple members to extend from the outwardly extending arm portions, each temple member formed with an interior channel having a slot on a bottom wall and with substantially closed top and side walls and including an interior projection into the channel and with each side arm including a ratchet portion engaging the interior projection for providing a plurality of fixed telescoping positions and each individual means including a pair of pin members and a pair of openings for receiving the pin members and with one opening receiving one pin member for pivotable movement and with the other opening elongated and with a plurality of fixed positions and with the other opening receiving the other pin member for sliding movement to any one of the fixed positions for producing a pivoting of the individual temple members about the one pin member.

13 Claims, 8 Drawing Figures

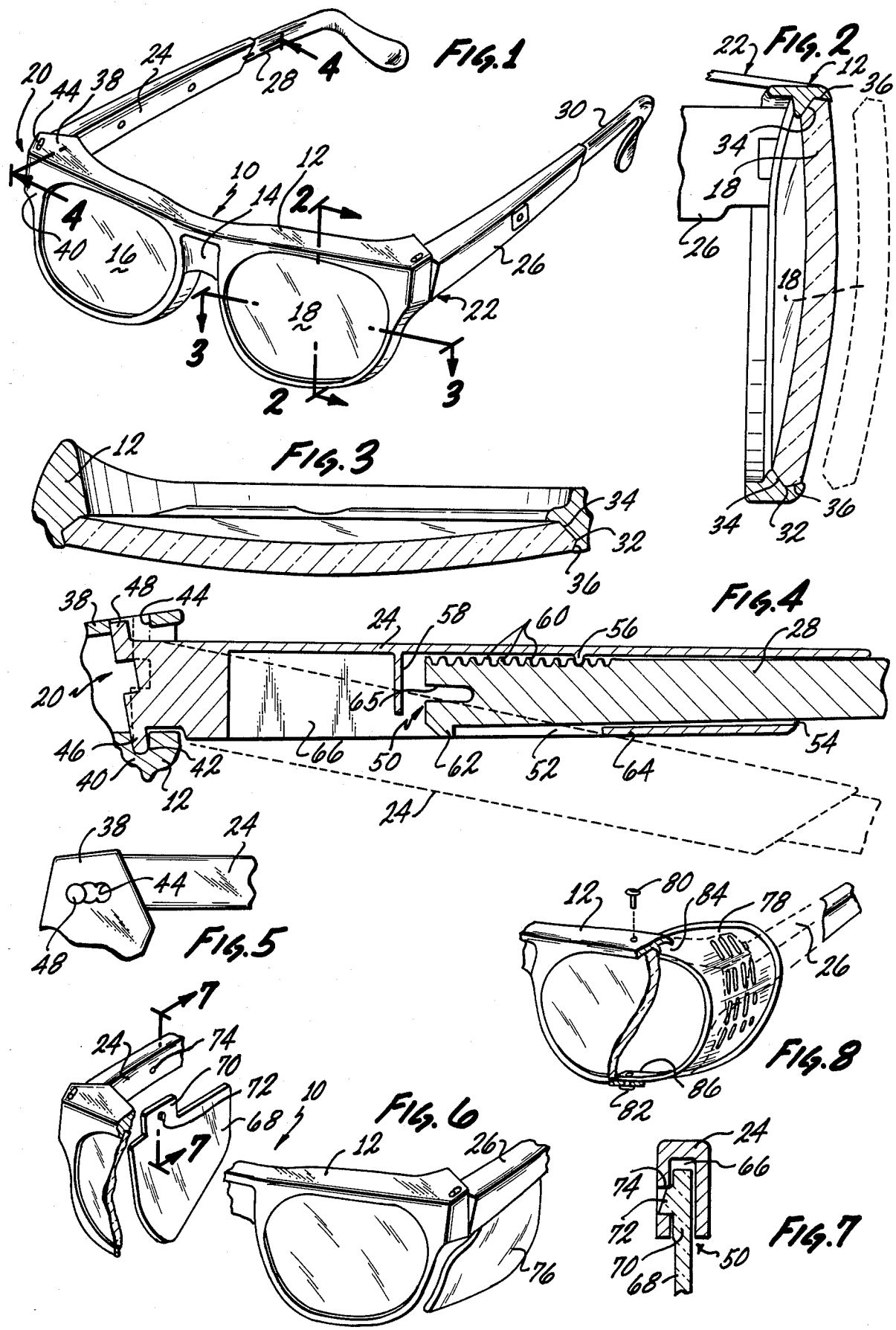

ADJUSTABLE SAFETY SPECTACLE

The present invention is directed to an improved safety spectacle which is fully adjustable so as to allow for the proper fitting and use of the spectacle by the wearer.

With the safety spectacle of the present invention, the temples may be pivoted to one of a number of fixed positions so as to adjust the angle of the temples relative to the frame. In addition, the temples include side arms which telescope so as to provide for the proper fit behind the ear. Although prior art safety spectacles have provided for both pivoting and telescoping, the present invention includes an improved construction to provide for these adjustable features.

The safety spectacle of the present invention also is designed to be used with different types of side shields. In particular, a cup type of side shield may be incorporated with the safety spectacle and with this cup type side shield held in place on the frame by a metal eyelet. This type of attachment for the cup type side shield is more secure than prior art methods of attachment and prevents the removal of the cup type shield. The safety spectacle of the present invention may also be used with a flat fold type side shield that is attached to the temple through the use of a tang which is inserted into a slot located at the bottom wall of the temple.

Although the safety spectacle may use the different types of side shields described above or may use no side shields at all, the safety spectacle of the present invention has a single basic design which encompasses all of the different types of side shields. This single design provides ease in manufacturing since the same safety spectacle is used as the basic structure no matter what type of side shield is desired by the customer.

The safety spectacle of the present invention is designed to allow for the simple removal of the lenses and a subsequent replacement of the lenses. This removal and replacement is in accordance with a particular groove design for the holding of the lenses in place in the frame. The prior art safety spectacles either required the frame to be heated so as to replace the lenses or required the frame to be disassembled in order to provide for the replacement of the lenses. Since the lenses of the present invention may be easily removed and replaced without the use of special tools and equipment, this encourages the replacement of lenses which are damaged or of an improper color.

With the safety spectacle of the present invention the frame includes outwardly extending upper portions to form support arms for the temples. The inner end of each of the temple members include outwardly extending pin members and the support arm portions of the frame include openings to receive the pin members. One of the openings is approximately the same configuration as one of the pin members but is slightly enlarged to allow for pivoting of the one pin member within the one opening. The other opening has an elongated configuration and is ridged at periodic positions to allow for the other pin member to be fixed in one of a number of particular positions. This supporting structure for the temples allows the temples to be pivoted around the one pin and fixed in position in accordance with the position of the second pin in the elongated opening so as to control the angle of the temples.

The telescoping side arms of the present invention slide within channels in the temple members. In particular, each temple member is substantially closed on three sides and includes a slot through the bottom wall of the temple member to communicate with the channel. A small interior projection extends from a position within the channel and cooperates with a ratchet portion along one edge of the side arm. This structure allows for the telescoping side arm to be fixed in one of a large number of positions to provide for the adjustment of the side arm. Each side arm also includes a projection which extends outwardly and is received within the slot within the bottom wall of the temple. The outwardly extending projections serves as a stop member in conjunction with the end of the slot in the bottom wall of the temple. A forward portion of the slot in the bottom wall of the temple also serves to receive a tang portion of the flat fold side shield so as to lock the flat fold side shield within this forward portion of the temple member.

The pivoting mechanism for the safety spectacle of the present invention also includes a flange portion at the outwardly extending upper portion of the frame so as to enclose the pivoting inner end of the temple member. The upper pin member of the temple member actually extends through this flange portion and with the elongated slot within the flange portion. The temple member therefore pivots at its inner end but is enclosed at this inner end portion by the outwardly extending arm structure of the temple member. The pivoting structure is simple but secure and holds the pivoting adjustment of the temple member in the different fixed positions.

Since the temple members include a slot only along the bottom surface, this eliminates openings on the side or top walls of the temple member. In addition, the use of the ratchet along one edge of each of the side arms and with a single projection inside the channel provides for a relatively simple telescoping structure. The various components of the present invention are therefore easier to make and assemble than the prior art devices. In addition, the slot in the bottom wall of the temple member is extended forwardly so as to receive a tang on the flat fold side shield and therefore the same structure can be used either with or without the flat fold side shield. Alternately, the same frame st1ucture can be used to receive a cup shield and with the cup shield attached by an eyelet to the frame for security.

The safety spectacle of the present invention therefore provide for a number of advantages over the prior art safety spectacles and a clearer understanding of the present invention would be had with reference to the following description and drawings wherein FIG. 1 illustrates a perspective view of a safety spectacle of the present invention;

FIG. 2 is a cross-sectional view of the safety spectacle, taken along lines 2—2 of FIG. 1 and showing the removable lens;

FIG. 3 is a cross-sectional view taken along lines 3—3 of FIG. 1;

FIG. 4 is a cross-sectional view taken along lines 4—4 of FIG. 1 and illustrates the pivoting and telescoping of the temple members;

FIG. 5 is a detailed top view showing the pivoting adjustment;

FIG. 6 is a partially broken away view of the safety spectacle illustrating the use of a flat fold side shield;

FIG. 7 is a cross-sectional view taken along lins 7—7 of FIG. 6; and

FIG. 8 is a partial view of the safety spectacle illustrating the use of a cup side shield.

In FIG. 1, a perspective view of a safety spectacle 12 constructed in accordance with the teachings of the present invention is shown. The safety spectacle 10 includes a frame member 12 having a nose bridge 14 of a universal type for maximum comfort and fit. The frame member 12 receives and supports lenses 16 ad 18 and the lenses are generally made of an unbreakable optical grade plastic material. As will be explained, the lenses may be easily removed and replaced without the use of special tools or equipment.

The frame member 12 includes outwardly extending upper arm portions 20 and 22. The arm portions 20 and 22 are designed to receive the ends of temple members 24 and 26 and include means to allow for a pivoting of the temple members. In addition, the temple members include telescoping side arms 28 and 30 and the combination of the telescoping and pivoting provide for an optimum fit without the need for special adjustments or different temples sizes.

FIG. 2 illustrates in cross-sectional view the lens 18 retained in position by the frame 12. In particular, the frame 12 includes a groove 32 which receives and secures the outer perimeter of the lens 18. The groove 32 is formed with a back wall portion 34 which has a relatively steep angle so as to resist the lens from being pushed through the frame on impact to the front of the lens. However, the groove 32 also includes a front wall portion 36 which has a relatively shallow angle so as to allow for the lens to be pushed out of the groove from the rear of the lens. The outer perimeter of the lens 18 has a configuration complementary to the shape of the groove 32. Ths structure allows for an easy removal and replacement of the lens without the use of special tools or equipment.

FIG. 3 illustrates a further cross-sectional view of the lens 18 in the frame 12 taken along lines 3—3 of FIG. 2. FIG. 3 also shows the lens 18 retained within the frame 12 and with the groove 32 including the walls 34 and 36 providing for the retention of the lens 18 in position. Since the lens 18 may be easily removed and replaced without the use of special tools or equipment, this allows for a quick replacement of a lens if it is cracked or scratched and also a replacement of the lens to change the color of the lens.

FIG. 4 illustrates in more detail the structure for providing the pivoting and telescoping features of the temple members of the present invention. As shown in FIG. 4, the frame 12 includes the outwardly extending arm portion 20 and with this arm portion including a recess to receive the inner end of the temple member 24. The outwardly extending arm portion 20 includes an upper flange member 38 and a lower support section 40. The arm portion 22 shown in FIG. 1 includes similar structure. The lower support section 40 includes an opening 42 and the upper flange member 38 includes an elongated opening as can be more clearly seen in FIG. 5. The elongated opening 44 is formed with a ratchet configuration so as to provide for stepped positions, and specifically three stepped positions are shown in FIG. 5.

The temple member 24 includes at its inner end a pair of pin projections 46 and 48. The pin projections are received within the openings 42 and 44. Specifically the opening 42 is slightly enlarged so that the pin projection 46 can pivot within the opening 42 while the pin projection 48 is ratcheted to one of the plurality of positions within the opening 44. As shown in FIG. 4, the full line and dotted line views illustrate the pivoting of the temple 24 so as to adjust for the degree of rake between the temple and the frame member 12. The pivoting thereby provides for an optimum fit for the safety spectacles of the present invention.

Since the temple 24 pivots about only one of the pin projections 46, the structure is simple yet is quite secure and holds the pivot adjustment position while the safety spectacles are worn. In addition, the pin projections 46 and 48 allow for the swiveling of the temple 24 so that the temple may lie flat against the frame when not in use. The outwardly extending portion 20 including the upper flange 38 and the lower support section 40 substantially enclose the inner end of the temple member 24 including the pin projections 46 and 48. This protects the pivoting structure and reduces the possibility of any damage to the pivoting mechanism. The extended portion of the frame perimeter 38 also acts as a further barrier to dust or other particles that would try to enter the eye over the top of the frame.

The temple member 24 includes an internal channel 50 for receiving the side arm 28 in telescoping fashion. The channel 50 is substantially enclosed on both sides and top but there is a bottom slot 52 giving access to the interior of the channel. Also, the end 54 of the temple member 24 is open to receive the side arm 28. Since the temple member is enclosed on the sides and top, this gives a flush attractive appearance and also simplifies the manufacture and assembly of the telescoping structure.

The interior channel 50 includes a small projection 56 and a larger projection 58. The inner end of the side arm 28 includes an upper ratchet portion 60 and a lower stop projection 62. It can be seen that as the side arm 28 is moved within the channel 50, the projection 56 engages individual positions of the ratchet 60 to provide for a plurality of individual telescoping positions. The larger projection 58 acts as an inner stop to limit the inner movement of the side arm 28. The larger projection 58 also acts as a retaining and aligning wall for the flat fold side shield. The lower stop projection 62 operates as an outer limit stop so that the side arm cannot be completely pulled out of the channel 50. The lower stop projection 62 operates in conjunction with a bottom wall portion 64 of the temple piece 24. A slot 65 in the arm 28 directly above the tab 62 allows the inner end of the arm to flex to aid in the insertion and removal of the arm.

As can be seen in FIG. 4, the channel 50 is actually formed as two portions located on either side of the long projection 56. A portion 66 located forward of the projection 58 may be used to receive and secure a flat fold side shield. This may be seen in FIGS. 6 and 7 where a flat fold side shield 68 is shown to have a tang 70. The tang 70 fits within the portion 66 of the channel 50. In order to lick the flat fold side shield 68 in position, a pin projection 72 is included as part of the tang 70 and with the pin 72 locked within an opening 74 in the temple 24. The pin 72 is angled to produce a ramp allowing ease of assembly but still retaining maximum lock to prevent removal of the side shield. Once the pin 72 is locked in position, the flat fold side shield is securely retained and cannot be easily removed. This can be seen in more detail in FIG. 7 where the pin 72 is shown to be retained securely within the opening 74 when the tang 70 is positioned within the portion 66 of the channel 50. It is to be appreciated that a similar flat fold side shield 76 is used in conjunction with the temple member 26.

As an alternative to the use of the flat fold side shield, a cup shaped side shield 78 may be used as shown in FIG. 8. Specifically, the cup side shield 78 is attached to the frame 12 through the use of metal eyelets 80 and 82. The eyelets 80 and 82 extend through an inner portion of the frame 12 and pass through openings in end portions 84 and 86 of the cup side shield 78. The metal eyelets are riveted in position to securely lock the ends of the cup shield 78 and prevent the cup shield from being removed.

It can be seen that the same basic safety spectacle can be used with different types of side shields but only a single style safety spectacle need be produced. If the customer orders the safety spectacle with or without side shields then the spectacle may be supplied in the desired configuration. In addition, different color lenses may be easily inserted depending upon the customers requirement. The inventory requirements may therefore be considerably reduced, yet the safety spectacle of the present invention may be easily adaptable to the particular customer's requirement.

The safety spectacle of the present invention, therefore, includes a basic frame and temple structure which is simple in structure and easy to manufacture and assemble, yet is reliable and secure in operation. The pivoting and telescoping mechanism also has a clean design which is attractive in appearance. The present invention, therefore, provides for an improved safety spectacle over that provided by the prior art.

Although the invention has been shown with reference to particular embodiments it should be appreciated that various adaptations and modifications may be made and the invention is only to be limited by the appended claims.

I claim:

1. An adjustable safety spectacle including
a frame member including a nose bridge and lens supporting sections extending from the nose bridge and with the lens supporting sections including outwardly extending arm portions forming recesses at opposite ends of the frame member,
a pair of temple members each having an inner end portion received within a recess,
individual means coupled to the outwardly extending arm portions of the frame member and the inner end portions of the temple members for individually pivotably mounting the temple members to extend from the outwardly extending arm portions, and
each means including a pair of pin members extending from opposite sides of the inner end portion of each temple member and a pair of openings on opposite sides of each recess formed by the oppositely extending arm portion for receiving the pin members and with one opening having a configuration for receiving one pin member for only pivotable movement and with the other opening having an elongated configuration having a plurality of stop positions for receiving the other pin member for sliding movement along the elongated opening to any one of the stop positions in accordance with pivotable movement of the one pin member in the one opening for producing a pivoting of the individual temple members, within the recess formed by the outwardly extending arm portion.

2. The adjustable safety spectacle of claim 1 wherein each recess formed by the outwardly extending arm portions includes an upper flange and a lower support section and with the one opening in the lower support section and the other elongated opening in the upper flange.

3. The adjustable safety spectacle of claim 1 wherein the lens supporting sections of the flange member each include a groove formed by a back wall and a front wall and with the back wall having a relatively steep angle and the front wall having a relatively shallow angle and with each lens including outer peripheral wall portions complementary to the walls of the groove and with the steep back wall preventing the lens from being pushed out the back of the frame and with the shallow front wall allowing the lens to be pushed out the front of the frame thereby providing for replacement of the lens.

4. The adjustable safety spectacle of claim 1 additionally including individual flat fold side shields extending below each temple member and extending below each outwardly extending arm portion for shielding the sides of the spectacle.

5. The adjustable safety spectacle of claim 1 additionally including individual cup side shields pivotably mounted from the lens supporting sections for shielding the sides of the spectacle and with the cup side shields attached to the lens supporting sections using metal eyelets for preventing removal of the cup side shields.

6. The adjustable safety spectacle of claim 1 wherein the temple members each include a telescoping side arm for providing an adjustment in the length of the temple members, and with each temple member formed with an interior channel having a slot on a bottom wall and with substantially closed top and side walls and including an interior projection into the channel and with each side arm including a ratchet portion engaging the interior projection for providing a plurality of fixed telescopic positions and with each side arm including a projections engaging the slot and with an end of the slot in combination with the projection from the side arm preventing the side arm from being pulled out of the channel.

7. The adjustable safety spectacle of claim 6 additionally including individual flat fold side shields extending below each temple member and extending below each outwardly extending arm portion and with each flat fold side shield including an extension engaging a portion of the slot in each temple member for locking the flat fold side shield in position.

8. An adjustable safety spectacle including
a frame member including a nose bridge and lens supporting sections extending from the nose bridge and with the lens supporting sections including outwardly extending arm portions forming recesses at opposite ends of the frame member,
a pair of adjustable length temple members each having an inner end portion received within a recess,
individual means coupled to the outwardly extending arm portions of the frame member and the inner end portions of the temple members for individually mounting the temple members to extend from the outwardly extending arm portions,
each temple member includes a telescoping side arm for providing an adjustment in the length of the temple members, and
each temple member formed with an interior channel having a slot on a bottom wall and with substantially closed top and side walls and including an interior projection into the channel and with each side arm including a ratchet portion engaging the interior projection for providing a plurality of fixed telescoping positions and with each side arm including a projection engaging the slot and with an end of the slot in combination with the projection from the side arm preventing the side arm from being pulled out of the channel.

9. The adjustable safety spectacle of claim 8 wherein the individual means each include a pair of pin members extending from opposite sides of the inner end portion of each temple member and a pair of openings on opposite sides of each recess formed by the oppositely extending arm portions for receiving the pin members and with one opening having a configuration for receiving one pin member for only pivotable movement and with the other opening having an elongated configuration having a plurality of stop positions for receiving the other pin member for sliding movement along the elongated opening to any one of the stop positions in accordance with pivotable movement of the one pin member in the one opening for producing a pivoting of the individual temple members within the recesses formed by the outwardly extending arm portions.

10. The adjustable safety spectacle of claim 9 wherein each recess formed by the outwardly extending arm portions includes an upper flange and a lower support section and with the one opening in the lower support section and the other elongated opening in the upper flange.

11. The adjustable safety spectacle of claim 8 wherein the lens supporting sections of the frame member each include a groove formed by a back wall and a front wall and with the back wall having a relatively steep angle and the front wall having a relatively shallow angle and with each lens including outer peripheral wall portions complementary to the walls of the groove and with the steep back wall preventing the lens from being pushed out the back of the frame and with the shallow front wall allowing the lens to be pushed out the front of the frame thereby providing for replacement of the lens.

12. The adjustable safety spectacle of claim 8 additionally including individual cup side shields pivotably mounted from the lens supporting sections for shielding the sides of the spectacle and with the cup side shields attached to the lens supporting sections using metal eyelets for preventing removal of the cup side shields.

13. The adjustable safety spectacle of claim 8 additionally including individual flat fold side shields extending below each temple member and extending below each outwardly extending arm portion and with each flat fold side shield including an extension engaging a portion of the slot in each temple member for locking the flat fold side shield in position.

* * * * *